US009929525B2

(12) United States Patent
Asada et al.

(10) Patent No.: US 9,929,525 B2
(45) Date of Patent: Mar. 27, 2018

(54) TERMINAL CONNECTION STRUCTURE FOR ELECTRICPOWER STEERING SYSTEM OF A VEHICLE

(71) Applicant: NSK LTD., Tokyo (JP)

(72) Inventors: Toshiaki Asada, Kanagawa (JP); Yusuke Kikuchi, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/540,778

(22) PCT Filed: Jan. 20, 2016

(86) PCT No.: PCT/JP2016/051588
§ 371 (c)(1),
(2) Date: Jun. 29, 2017

(87) PCT Pub. No.: WO2016/129347
PCT Pub. Date: Aug. 18, 2016

(65) Prior Publication Data
US 2017/0373451 A1 Dec. 28, 2017

(30) Foreign Application Priority Data

Feb. 10, 2015 (JP) ................. 2015-024607

(51) Int. Cl.
H01R 9/24 (2006.01)
H01R 39/02 (2006.01)
(Continued)

(52) U.S. Cl.
CPC ............... H01R 39/02 (2013.01); B62D 5/04 (2013.01); H01R 9/24 (2013.01); H01R 43/26 (2013.01)

(58) Field of Classification Search
CPC ............. H01R 43/26; H01R 9/24; B62D 5/04
(Continued)

(56) References Cited

U.S. PATENT DOCUMENTS 4,127,312 A * 11/1978 Fleischhacker ...... H01R 4/2429
439/403
5,178,558 A * 1/1993 Knox .................. H01R 4/2433
439/404
(Continued)

FOREIGN PATENT DOCUMENTS

EP 2 892 130 A1 7/2015
JP 59-115692 U1 8/1984
(Continued)

OTHER PUBLICATIONS

International Search Report of PCT/JP2016/051588 dated Apr. 19, 2016.
(Continued)

Primary Examiner — Harshad C Patel
(74) Attorney, Agent, or Firm — Sughrue Mion, PLLC

(57) ABSTRACT

A terminal connection structure includes a first terminal, a second terminal, and a terminal guide. The first terminal includes a held portion. The second terminal includes a plate-shaped base portion, a pair of holding portions projecting from one end of the base portion to hold the held portion from both sides, and a plate-shaped bridge portion projecting from the other end of the base portion in a direction crossing relative to the base portion. The terminal guide includes a guide hole having one end at which the first terminal is disposed, and the other end from which the second terminal is inserted.

8 Claims, 17 Drawing Sheets

(51) Int. Cl.
*H01R 43/26* (2006.01)
*B62D 5/04* (2006.01)

(58) Field of Classification Search
USPC .................................................. 439/34, 76.1
See application file for complete search history.

(56) References Cited

U.S. PATENT DOCUMENTS

| | | | | | |
|---|---|---|---|---|---|
| 5,281,163 | A | * | 1/1994 | Knox | H01R 4/2433 |
| | | | | | 439/404 |
| 5,504,654 | A | * | 4/1996 | Knox | H01R 4/2433 |
| | | | | | 361/119 |
| 6,045,392 | A | * | 4/2000 | Daoud | H01R 4/2433 |
| | | | | | 439/403 |
| 6,716,054 | B1 | * | 4/2004 | Denovich | H01R 4/2433 |
| | | | | | 174/255 |
| 7,223,115 | B2 | * | 5/2007 | Hashim | H01R 4/245 |
| | | | | | 439/403 |
| 7,273,398 | B2 | * | 9/2007 | Taylor | H05K 1/141 |
| | | | | | 439/620.2 |
| 7,762,833 | B2 | * | 7/2010 | Neumetzler | H01R 9/2441 |
| | | | | | 439/404 |
| 7,946,878 | B2 | * | 5/2011 | Lang | H01R 9/2458 |
| | | | | | 439/404 |
| 2010/0285686 | A1 | | 11/2010 | Lang et al. | |
| 2014/0091683 | A1 | | 4/2014 | Ito et al. | |
| 2015/0171709 | A1 | | 6/2015 | Ito et al. | |

FOREIGN PATENT DOCUMENTS

| | | |
|---|---|---|
| JP | 06-510884 A | 12/1994 |
| JP | 2010-508646 A | 3/2010 |
| JP | 2013-196973 A | 9/2013 |
| WO | 2014/033833 A1 | 3/2014 |

OTHER PUBLICATIONS

Communication from the European Patent Office dated Jan. 24, 2018 in European Patent Application No. 16748992.1.

\* cited by examiner

TERMINAL CONNECTION STRUCTURE FOR ELECTRICPOWER STEERING SYSTEM OF A VEHICLE

CROSS REFERENCE TO RELATED APPLICATIONS

This is a National Stage of International Application No. PCT/JP2016/051588 filed Jan. 20, 2016, claiming priority based on Japanese Patent Application No. 2015-024607 filed Feb. 10, 2015, the contents of all of which are incorporated herein by reference in their entirety.

FIELD

The present invention relates to a terminal connection structure, a motor, an actuator, an electric power steering system, and a vehicle.

BACKGROUND

Electric power steering systems generating a steering assist torque by electric motors includes an electronic control unit being a device for controlling an electric motor. As a technique for electrically connecting the electric motor and the electronic control unit, for example, a technique described in Patent Literature 1 is known. In Patent Literature 1, a terminal connection part is structured by pressing first conduction terminals having a plate-shaped shaft portion into second conduction terminals having a pair of holding portions.

CITATION LIST

Patent Literature

Patent Literature 1: JP 2013-196973 A

SUMMARY

Technical Problem

Incidentally, before a first terminal having a plate-shaped member and a second terminal having holding members are connected, position of the second terminal relative to the first terminal may be displaced from a predetermined position, depending on accuracy or the like of an assembly machine. When the first terminal is pressed to the second terminal, while the second terminal is displaced relative to the first terminal, inclination is generated in the holding members of the second terminal. Thus, an area of a contact portion of the second terminal with the first terminal, and a pressure applied to the contact portion may be reduced, and thus, there is a possibility of increasing a contact resistance between the first terminal and the second terminal.

The present invention has been made in view of the above problems, and an object of the present invention is to provide a terminal connection structure, a motor, an actuator, an electric power steering system, and a vehicle which can inhibit increase in contact resistance between a first terminal and a second terminal.

Solution to Problem

To achieve the above object, a terminal connection structure according to the present invention includes a first terminal including a held portion, a second terminal including a plate-shaped base portion, a pair of holding portions projecting from one end of the base portion to hold the held portion from both sides, and a plate-shaped bridge portion projecting from the other end of the base portion in a direction crossing relative to the base portion, and a terminal guide including a guide hole having one end at which the first terminal is disposed, and the other end from which the second terminal is inserted.

When a second terminal is inserted into a guide hole, if a position of the second terminal relative to a guide hole is displaced in a width direction, a reaction force is applied to the second terminal from the guide hole. In such a state, a bridge portion has a plate-shaped member orthogonal to a base portion, and thus is readily deformed. Deformation of the bridge portion corrects an attitude of a holding portion in conformity to the guide hole. Thus, an area of a contact portion of the second terminal with a first terminal, and a pressure applied to the contact portion are each maintained to a predetermined magnitude. Accordingly, a terminal connection structure according to the present invention can inhibit increase in contact resistance between the first terminal and the second terminal.

As a desirable embodiment of the present invention, it is preferable that the second terminal includes a tapered portion between the base portion and the holding portions, the tapered portion having a length reduced toward ends of the holding portions, the length being in a width direction which is a direction parallel to a surface of the base portion and orthogonal to a projecting direction of the holding portion. Therefore, a position receiving the reaction force from the guide hole is located at a position far from the bridge portion and not overlapping the holding portion. Thus, the reaction force from the guide hole acts on the bridge portion, as a bending moment according to a distance from the bridge portion to a tapered portion, and the reaction force is hardly consumed as a force deforming the holding portion. Accordingly, the reaction force from the guide hole is efficiently transferred as a force deforming the bridge portion, and the bridge portion can be deformed more easily.

As a desirable embodiment of the present invention, it is preferable to include a preliminary positioning mechanism positioning ends of the holding portions at one end of the guide hole, before the second terminal is connected to the first terminal. Therefore, a preliminary positioning mechanism temporarily determines a position of the holding portion in a height direction, immediately before connection of the first terminal and the second terminal. Thus, determination of whether to adjust position of the holding portion relative to a held portion is facilitated.

As a desirable embodiment of the present invention, it is preferable to include a first window exposing a base side end portion of the pair of holding portions. Therefore, a position of the holding portion in a height direction can be readily confirmed.

As a desirable embodiment of the present invention, it is preferable to include a second window exposing a connection part between the holding portions and the held portion. Therefore, connection between the holding portion and the held portion can be readily confirmed.

As a desirable embodiment of the present invention, it is preferable that a motor is connected to an electronic control unit through the terminal connection structure. Therefore, the motor can inhibit the increase in contact resistance between the first terminal and the second terminal, and the life of the motor is increased.

As a desirable embodiment of the present invention, it is preferable that an actuator includes the motor and a reduction gear. Therefore, an actuator can inhibit the increase in contact resistance between the first terminal and the second terminal, and the life of the actuator is increased.

As a desirable embodiment of the present invention, it is preferable that an electric power steering system acquires a steering assist torque from the actuator. Therefore, an electric power steering system can inhibit the increase in contact resistance between the first terminal and the second terminal, and the life of the electric power steering system is increased.

As a desirable embodiment of the present invention, it is preferable that the electric power steering system is mounted on a vehicle. Therefore, the vehicle can inhibit the increase in contact resistance between the first terminal and the second terminal, and the life of the vehicle is increased.

Advantageous Effects of Invention

The present invention can provide a terminal connection structure, a motor, an actuator, an electric power steering system, and a vehicle which can inhibit increase in contact resistance between a first terminal and a second terminal.

DESCRIPTION OF EMBODIMENTS

Modes for carrying out the present invention (embodiments) will be described in detail with reference to the drawings. The present invention is not limited to the description of the following embodiments. Furthermore, elements described below include elements easily conceived by a person skilled in the art, and elements substantially identical to each other. In addition, the elements described below may be appropriately combined.

Embodiment

Figure 1:
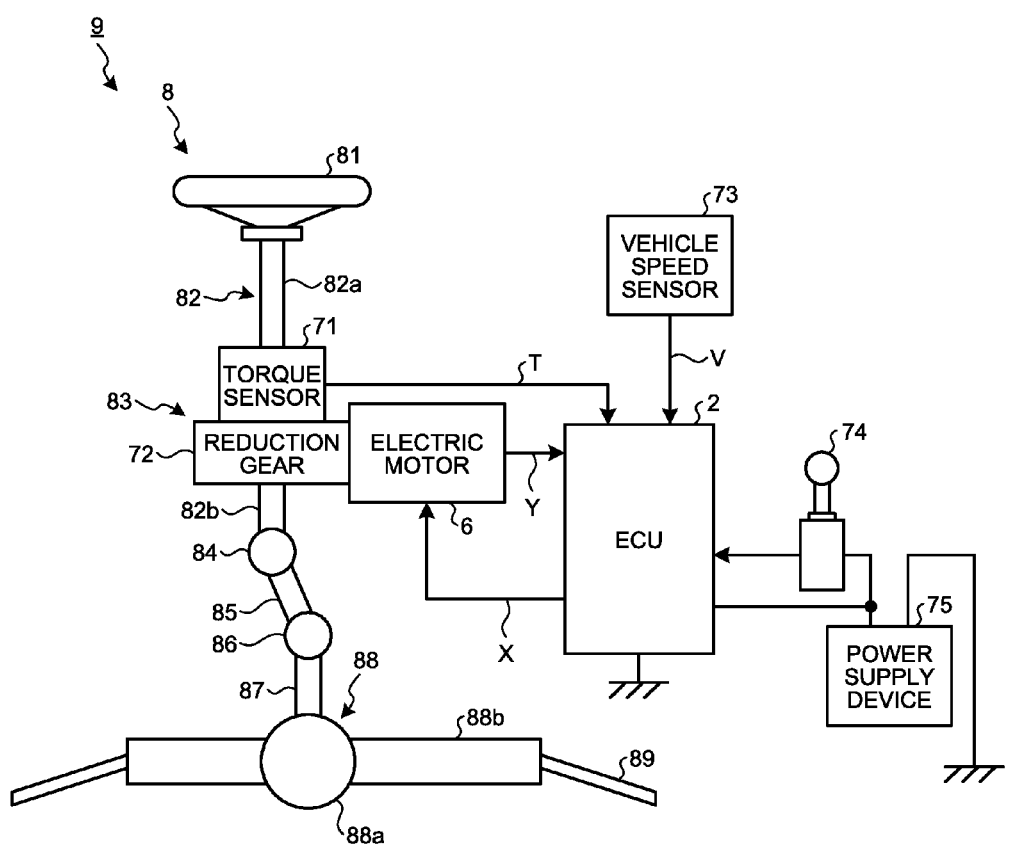
FIG. 1 is a schematic diagram illustrating an electric power steering system according to the present embodiment.
Figure 21:
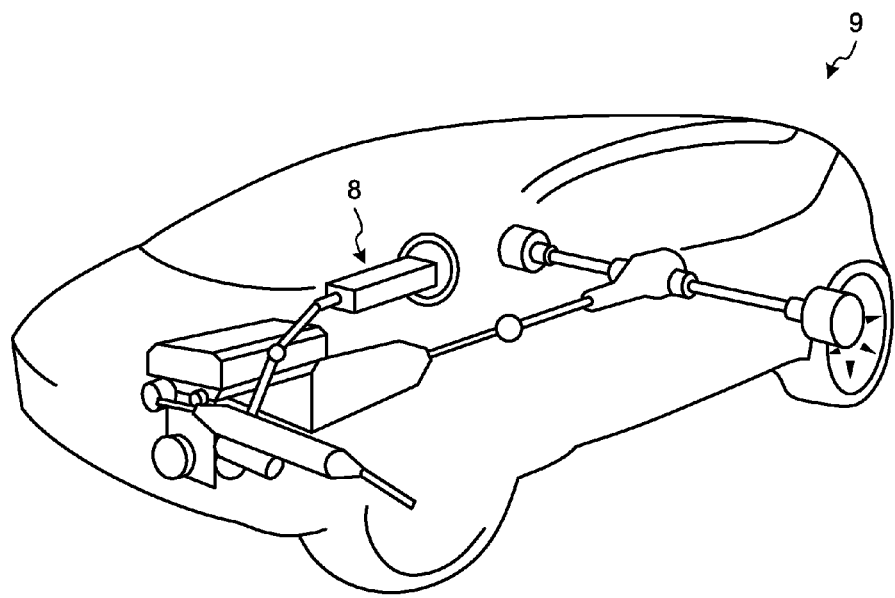
FIG. 21 is a schematic diagram illustrating a vehicle according to the present embodiment.

FIG. 1 is a schematic diagram illustrating an electric power steering system according to the present embodiment. An electric power steering system 8 is mounted for example to a vehicle 9, as illustrated in FIG. 21. The electric power steering system 8 includes a steering wheel 81, a steering shaft 82, an actuator 83, a universal joint 84, a lower shaft 85, and a universal joint 86, in order of transmission of power given from a steering person (driver), and is connected further to a pinion shaft 87, a steering gear 88, and a tie rod 89.

The steering shaft 82 includes an input shaft 82*a* and an output shaft 82*b*. The input shaft 82*a* has one end portion connected to the steering wheel 81, and the other end portion connected to the actuator 83. The output shaft 82*b* has one end portion connected to the actuator 83, and the other end portion connected to the universal joint 84. In the present embodiment, the input shaft 82*a* and the output shaft 82*b* are made of, for example a common steel material such as a mechanical structural carbon steel (so-called SC material) or a carbon steel tube for machine structural purpose (so-called STKM material).

The lower shaft 85 has one end portion connected to the universal joint 84, and the other end portion connected to the universal joint 86. The pinion shaft 87 has one end portion connected to the universal joint 86, and the other end portion connected to the steering gear 88.

The steering gear 88 includes a pinion 88*a* and a rack 88*b*. The pinion 88*a* is connected to the pinion shaft 87. The rack 88*b* meshes with the pinion 88*a*. The steering gear 88 is structured in a form of rack and pinion. The steering gear 88 converts rotation motion transmitted to the pinion 88*a* to linear motion using the rack 88*b*. The tie rod 89 is connected to the rack 88*b*.

The actuator 83 includes an electric motor 6 and a reduction gear 72. Note that, for the electric motor 6, a so-called brushless motor is described as an example, but an electric motor including a brush (slider) and a commutator (rectifier) may be used.

The electric motor 6 is an electrical motor generating a torque using three phase alternating current. The reduction gear 72 is for example a worm reduction gear. A torque generated by the electric motor 6 is transmitted to a worm wheel through a worm in the reduction gear 72 to rotate the worm wheel. The reduction gear 72 increases a torque generated by the electric motor 6 using the worm and the worm wheel. The reduction gear 72 is connected to the output shaft 82b, and applies a steering assist torque to the output shaft 82b. As described above, the actuator 83 can apply a steering assist torque to the output shaft 82b. The electric power steering system 8 according to the present embodiment is a column assist electric power steering system.

Furthermore, the electric power steering system 8 includes an electronic control unit (hereinafter, referred to as ECU) 2, a torque sensor 71, and a vehicle speed sensor 73.

The ECU 2 is electrically connected to the electric motor 6, the torque sensor 71, and the vehicle speed sensor 73. The ECU 2 controls operation of the electric motor 6. The torque sensor 71 is mounted to the input shaft 82a, and detects, as a steering torque T, a driver's steering force transmitted to the input shaft 82a through the steering wheel 81. The torque sensor 71 inputs the steering torque T to the ECU 2 for example through controller area network (CAN) communication. The vehicle speed sensor 73 detects a running speed (vehicle speed) of the vehicle 9 on which the electric power steering system 8 is mounted. The vehicle speed sensor 73 inputs a vehicle speed signal V to the ECU 2 through CAN communication.

The ECU 2 acquires a signal from each of the torque sensor 71 and the vehicle speed sensor 73. That is, the ECU 2 acquires the steering torque T from the torque sensor 71, and acquires the vehicle speed signal V of the vehicle 9 from the vehicle speed sensor 73. While an ignition switch 74 is on, power is supplied to the ECU 2 from a power supply device 75 having a battery for example mounted on the vehicle 9. The ECU 2 calculates a steering assist command value of an assist command, on the basis of the steering torque T and the vehicle speed signal V. Then, the ECU 2 adjusts a current value X supplied to the electric motor 6, on the basis of the calculated steering assist command value. The ECU 2 acquires, as operation information Y, information about induced voltage from the electric motor 6 or information output from a resolver or the like provided at the electric motor 6. Then, the ECU 2 controls the operation of the electric motor 6, and a torque generated by the electric motor 6 is transmitted to the reduction gear 72.

The steering torque (including steering assist torque) output through the output shaft 82b is transmitted to the lower shaft 85 through the universal joint 84, and further transmitted to the pinion shaft 87 through the universal joint 86. The steering torque transmitted to the pinion shaft 87 is transmitted to the tie rod 89 through the steering gear 88 to change a direction of a wheel.

Figure 2:
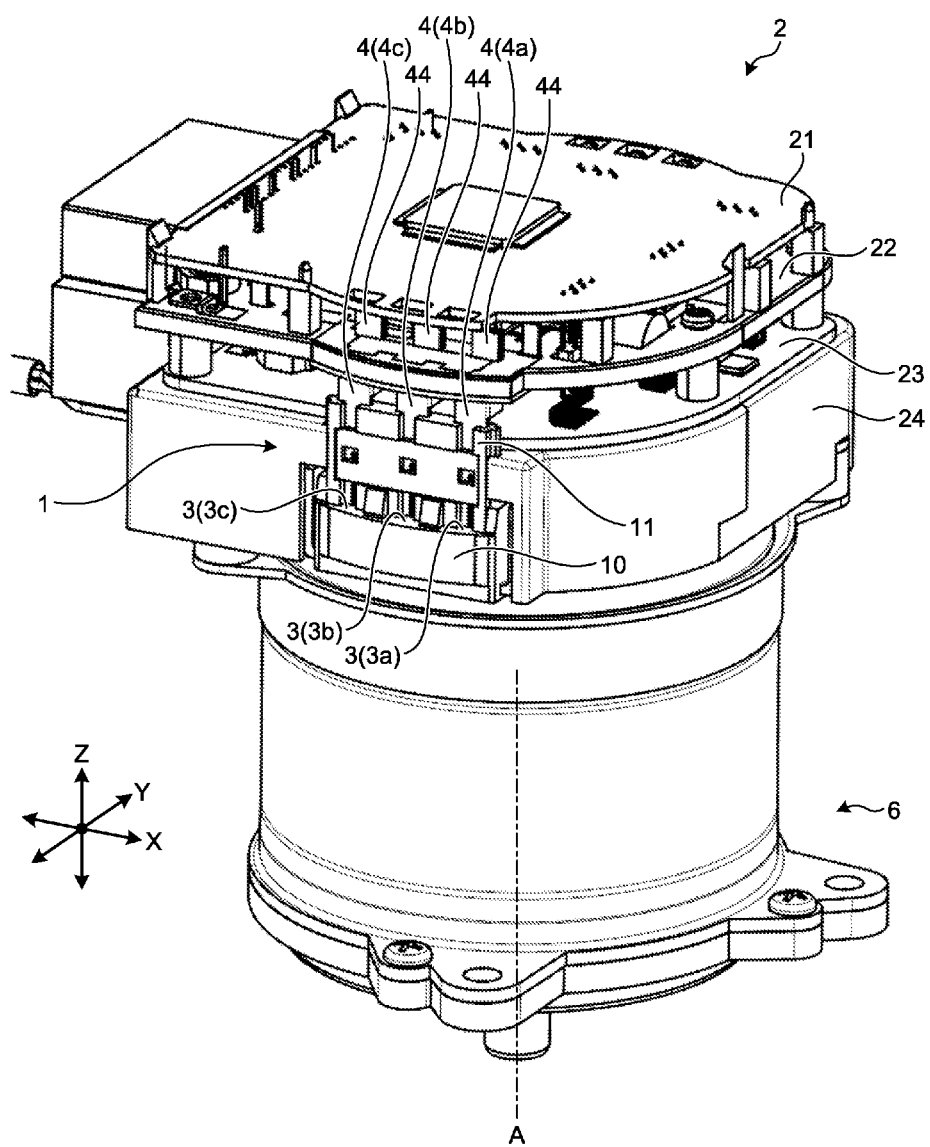
FIG. 2 is a perspective view illustrating an area around an electric motor according to the present embodiment.

FIG. 2 is a perspective view illustrating an area around the electric motor according to the present embodiment. As illustrated in FIG. 2, the ECU 2 is mounted on an end surface of the electric motor 6. The ECU 2 includes a first substrate 21, a second substrate 22, a third substrate 23, and a heat sink 24.

The first substrate 21 is a printed circuit board, and has a surface provided with an electronic component such as a micro controller unit, that is, MCU thereon. The second substrate 22 is an insert-molded plate in which discrete components such as a coil and a capacitor are insert-molded with a resin or the like. The third substrate 23 is a substrate made of metal such as an aluminum alloy, and has a surface provided with an electronic component such as a field effect transistor, that is, FET. The heat sink 24 is a casing made of metal such as an aluminum alloy.

The ECU 2 is mounted to the electric motor 6 through the heat sink 24. For example, the heat sink 24 is fastened to the electric motor 6 with fastening members such as bolts. The third substrate 23 is fixed in contact with the heat sink 24. The second substrate 22 is disposed to be spaced apart from the third substrate 23, and is supported by support members or the like raised on the third substrate 23. The first substrate 21 is disposed to be spaced apart from the second substrate 22, and is supported by support members or the like raised on the second substrate 22. As described above, the heat sink 24, the third substrate 23, the second substrate 22, and the first substrate 21 are layered in this order near the electric motor 6.

The first substrate 21 generates a control signal and inputs the control signal to the third substrate 23. The second substrate 22 absorbs noise from outside the ECU 2 and noise generated in the ECU 2. The third substrate 23 supplies a three-phase alternating-current power to the electric motor 6, through the second substrate 22, according to the control signal from the first substrate 21, and drives the electric motor 6. Furthermore, since the third substrate 23 is in contact with the heat sink 24, heat generated by the third substrate 23 is radiated through the heat sink 24.

As described in FIG. 2, the electric motor 6 according to the present embodiment is electrically connected to the ECU 2 by a terminal connection structure 1. The terminal connection structure 1 includes three first terminals 3 (first terminal 3a, first terminal 3b, and first terminal 3c), three second terminals 4 (second terminal 4a, second terminal 4b, and second terminal 4c), a motor side casing 10, and a terminal guide 11.

The motor side casing 10 is a member insert-molded with the three first terminals 3 integrally, and is mounted to an end surface of the electric motor 6. The motor side casing 10 supports the three first terminals 3 so that the three first terminals 3 are exposed on a side opposite to the electric motor 6. The terminal guide 11 is a member made of resin or the like, and mounted to the motor side casing 10 to face the three first terminals 3. The terminal guide 11 guides the three second terminals 4 toward the first terminals 3.

In the following description about the terminal connection structure 1, a direction parallel with a rotation axis A of the electric motor 6 is described as a height direction. The height direction is a Z direction illustrated in FIG. 2. When viewed from the terminal connection structure 1, the ECU 2 side along the height direction is described as an upper side, and the electric motor 6 side along the height direction is described as a lower side. An outside of the electric motor 6 in a radial direction is described as a depth direction. The depth direction is a Y direction illustrated in FIG. 2. When viewed from the terminal connection structure 1, an outside of the ECU 2 along the depth direction is described as a front side, and an inside of the ECU 2 along the depth direction is described as a back side. A direction which is same as a tangential direction relative to an outer peripheral surface of the electric motor 6 is described as a width direction. The width direction is an X direction illustrated in FIG. 9.

Note that the height direction, the depth direction, and the width direction are defined using the electric motor 6 for convenience, as described above, but the directions are not necessarily defined on the basis of the electric motor 6. That is, preferably the height direction is the Z direction, the depth direction is the Y direction, and the width direction is the X direction, in an XYZ coordinate system.

Figure 3:
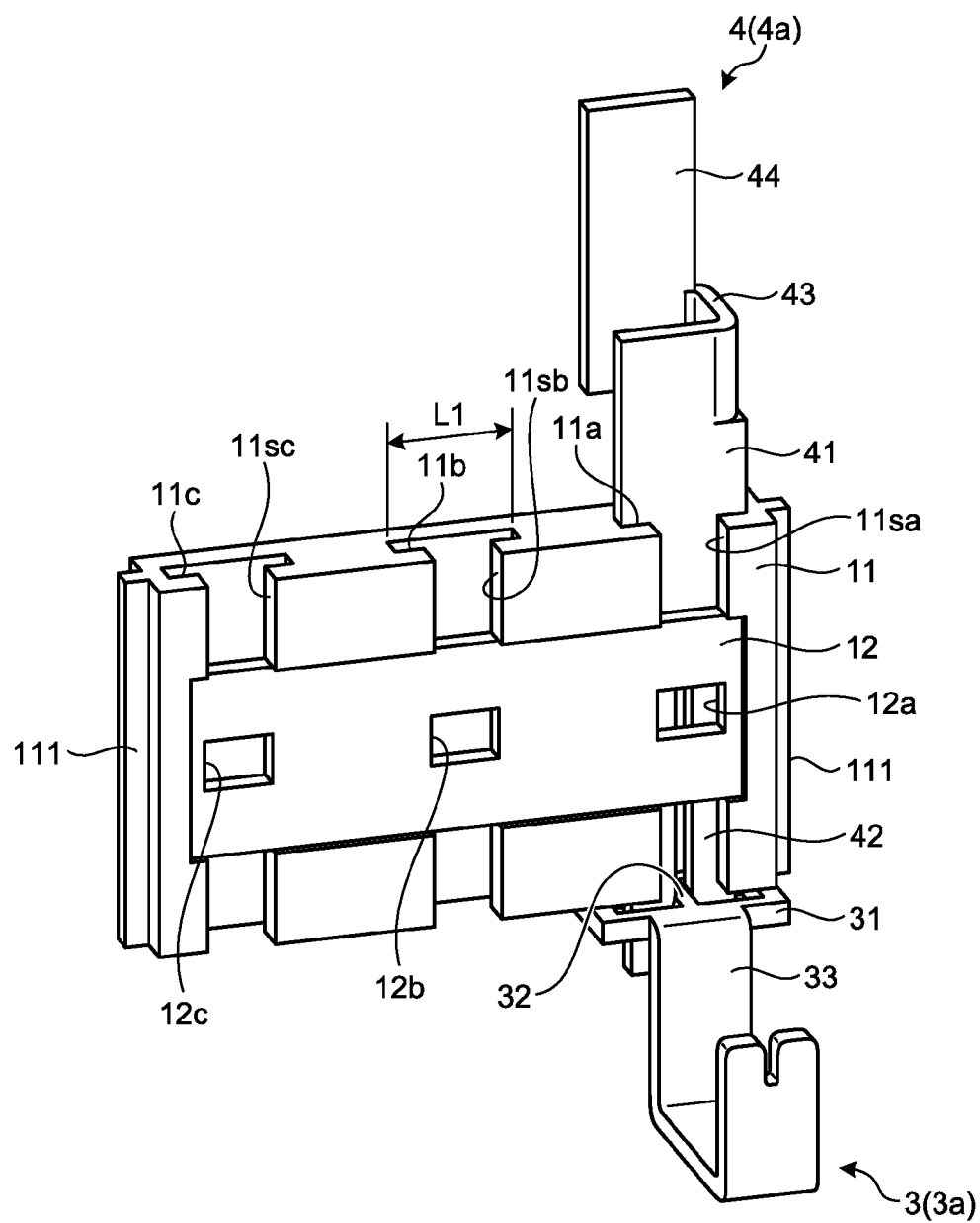
FIG. 3 is a partial perspective view illustrating a terminal connection structure according to the present embodiment.
Figure 4:
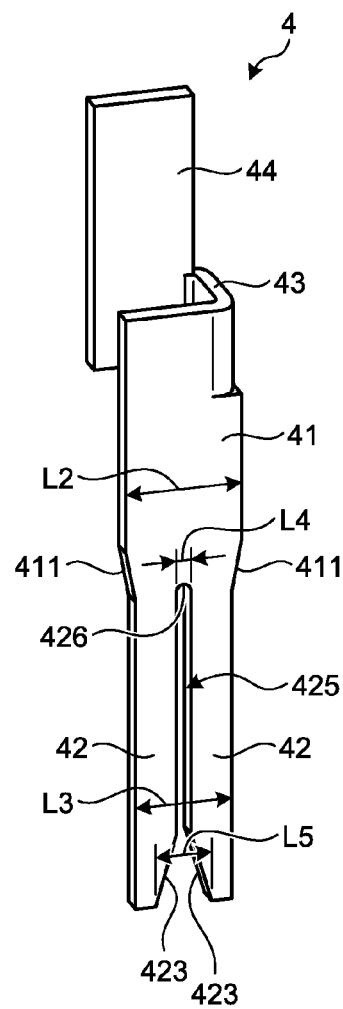
FIG. 4 is a perspective view of a second terminal according to the present embodiment.
Figure 5:
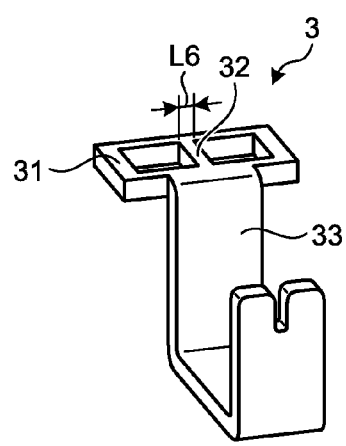
FIG. 5 is a perspective view of a first terminal according to the present embodiment.

FIG. 3 is a partial perspective view illustrating a terminal connection structure according to the present embodiment. FIG. 4 is a perspective view of a second terminal according to the present embodiment. FIG. 5 is a perspective view of a first terminal according to the present embodiment. Note that, in FIG. 3, the first terminal 3a and the second terminal 4a are typically illustrated, and the first terminal 3b, the first terminal 3c, the second terminal 4b, and the second terminal 4c are omitted.

As illustrated in FIG. 3, the terminal guide 11 is a plate-shaped member made of resin or the like, and includes a guide hole 11a, a guide hole 11b, a guide hole 11c, and a cover 12. The guide hole 11a, the guide hole 11b, and the guide hole 11c each have a rectangular through-hole penetrating the terminal guide 11 from one end surface to an opposite end surface, and are disposed to be aligned at equal intervals. Furthermore, the terminal guide 11 includes a slit 11sa, a slit 11sb, and a slit 11sc on the front side, positioned along the guide hole 11a, the guide hole 11b, and the guide hole 11c, respectively. Therefore, the guide hole 11a, the guide hole 11b, and the guide hole 11c each have an inside exposed on the front side of the terminal guide 11.

The cover 12 is a plate-shaped member made of resin or the like, and is disposed on the front side of the terminal guide 11. The cover 12 partially closes the slits 11sa, 11sb, and 11sc. Furthermore, the cover 12 includes three first windows of a first window 12a, a first window 12b, and a first window 12c. Each of the first windows 12a, 12b, and 12c is for example a rectangular-shaped opening portion. The three first windows of the first windows 12a, 12b, and 12c expose the inside of each of the guide hole 11a, the guide hole 11b, and the guide hole 11c, on the front side.

As illustrated in FIG. 4, the second terminal 4 is an electrical conductor made of metal such as copper, and includes a base portion 41, a holding portion 42, a bridge portion 43, and a connection portion 44. The base portion 41 is a plate-shaped member, and has a rectangular shape having long sides in a height direction, for example when viewed from the front side. The holding portion 42 is a plate-shaped member, and projects downward from one end of the base portion 41. One base portion 41 is provided with two holding portions 42. A pair of holding portions 42 is in parallel to each other, and faces each other through a slit 425. The holding portions 42 form a U-shaped terminal having a substantially U-shape when viewed from the front side. The holding portions 42 include, on the inside between ends, chamfered portions 423 inclined so that the slit 425 has a width increasing toward the end. Furthermore, tapered portions 411 are provided between the base portion 41 and the holding portions 42. Each of the tapered portions 411 has a length in a width direction decreasing from the base portion 41 toward each holding portion 42. The bridge portion 43 is a plate-shaped member orthogonal to the base portion 41, and projects from the other end of the base portion 41 to a back side. The connection portion 44 is a plate-shaped member parallel to the base portion 41 and orthogonal to the bridge portion 43, and projects upward from an end portion of the bridge portion 43, on a side opposite to the base portion 41. For example, the base portion 41, the bridge portion 43, and the connection portion 44 form a substantially U-shape, when viewed in the height direction. Thus, the second terminal 4 has a small slenderness ratio, in comparison with a second terminal 4 without the bridge portion 43 (the second terminal 4 having a linear shape as a whole, when viewed in the height direction). Accordingly, the second terminal 4 resists buckling. Furthermore, as illustrated in FIG. 2, the connection portion 44 penetrates the second substrate 22, and is electrically connected, for example connected by tungsten inert gas (TIG) welding to a terminal disposed on the second substrate 22. Furthermore, an upper end surface of the base portion 41 and an upper end surface of the bridge portion 43 are in contact with a lower surface of the second substrate 22 (surface facing the third substrate 23). Thus, an external force applied to the base portion 41, the holding portion 42, or the bridge portion 43 are received by the second substrate 22 through the base portion 41 and the bridge portion 43. Accordingly, a load is inhibited from being transmitted to a connected portion between the connection portion 44 and a terminal of the second substrate 22.

Described in the second terminal 4, the width direction can be referred to as a direction parallel to a surface of the base portion 41, and orthogonal to a projecting direction of the holding portion 42. The height direction can be referred to as the projecting direction of the holding portion 42.

As illustrated in FIG. 5, the first terminal 3 is an electrical conductor made of metal such as copper, and includes a base portion 31, a held portion 32, and a connection portion 33. The base portion 31 is an annular member having a rectangular shape when viewed in a height direction. The held portion 32 is a rod-shaped member having a rectangular cross-section, and is provided from one side on a front side to one side on a back side of the base portion 31. The held portion 32 is an I-shaped terminal having a substantially I-shape when viewed in the height direction. The connection portion 33 is a member projecting downward from the base portion 31, and has a substantially U-shape when viewed in a width direction. The connection portion 33 is embedded in the motor side casing 10 illustrated in FIG. 2 while electrically connected to a terminal of the electric motor 6 side. The connection portion 33 is electrically connected, for example connected by TIG welding to a terminal drawn from inside the electric motor 6.

Figure 14:
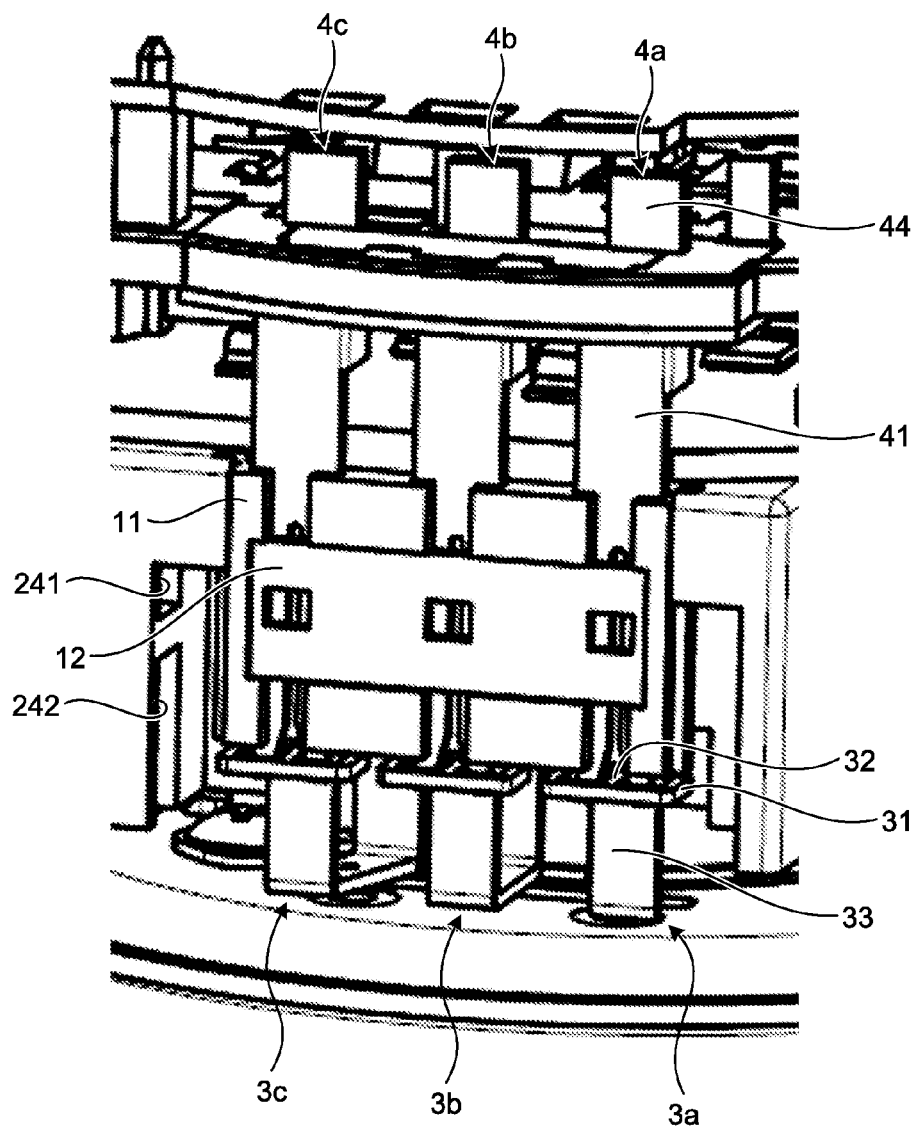
FIG. 14 is a view of the first terminals, where a motor side casing of FIG. 13 is omitted to expose the first terminals.

Note that the connection portion 33 of the first terminal 3 is not necessarily bent to the front side, as illustrated in FIG. 3. For example, as illustrated in FIG. 14 described later, the connection portions 33 may be bent to a back side. Furthermore, a shape of the connection portion 33 is not limited to the shape illustrated in FIG. 3, and the connection portion 33 preferably has a shape facilitating connection to a terminal drawn from inside the electric motor 6, and suitable for insert molding.

A length L2 of the base portion 41 in the width direction illustrated in FIG. 4, is substantially equal to a length L1 of each of the guide hole 11a, the guide hole 11b, and the guide hole 11c in the width direction illustrated in FIG. 3. A length L3 of the pair of holding portions 42 in the width direction illustrated in FIG. 4, is smaller than the length L1 of each of the guide hole 11a, the guide hole 11b, and the guide hole 11c in the width direction illustrated in FIG. 3. Furthermore, a minimum length L4 of the slit 425 in the width direction illustrated in FIG. 4, is smaller than a length L6 of the held portion 32 in the width direction illustrated in FIG. 5. A maximum length L5 of the slit 425 in the width direction illustrated in FIG. 4, is larger than the length L6 of the held portion 32 in the width direction illustrated in FIG. 5.

As illustrated in FIG. 3, the held portion 32 of the first terminal 3a is disposed at one end of the guide hole 11a. Furthermore, the holding portions 42 and the base portion 41 of the second terminal 4a are inserted from the other end of the guide hole 11a. The ends of the holding portions 42 penetrate the base portion 31 of the first terminal 3a, and the held portion 32 is held between the holding portions 42. As described above, since the minimum length L4 of the slit 425 is smaller than the length L6 of the held portion 32, the held portion 32 and the holding portions 42 are kept in contact. Thus, the first terminal 3a and the second terminal 4a are conducted.

Figure 6:
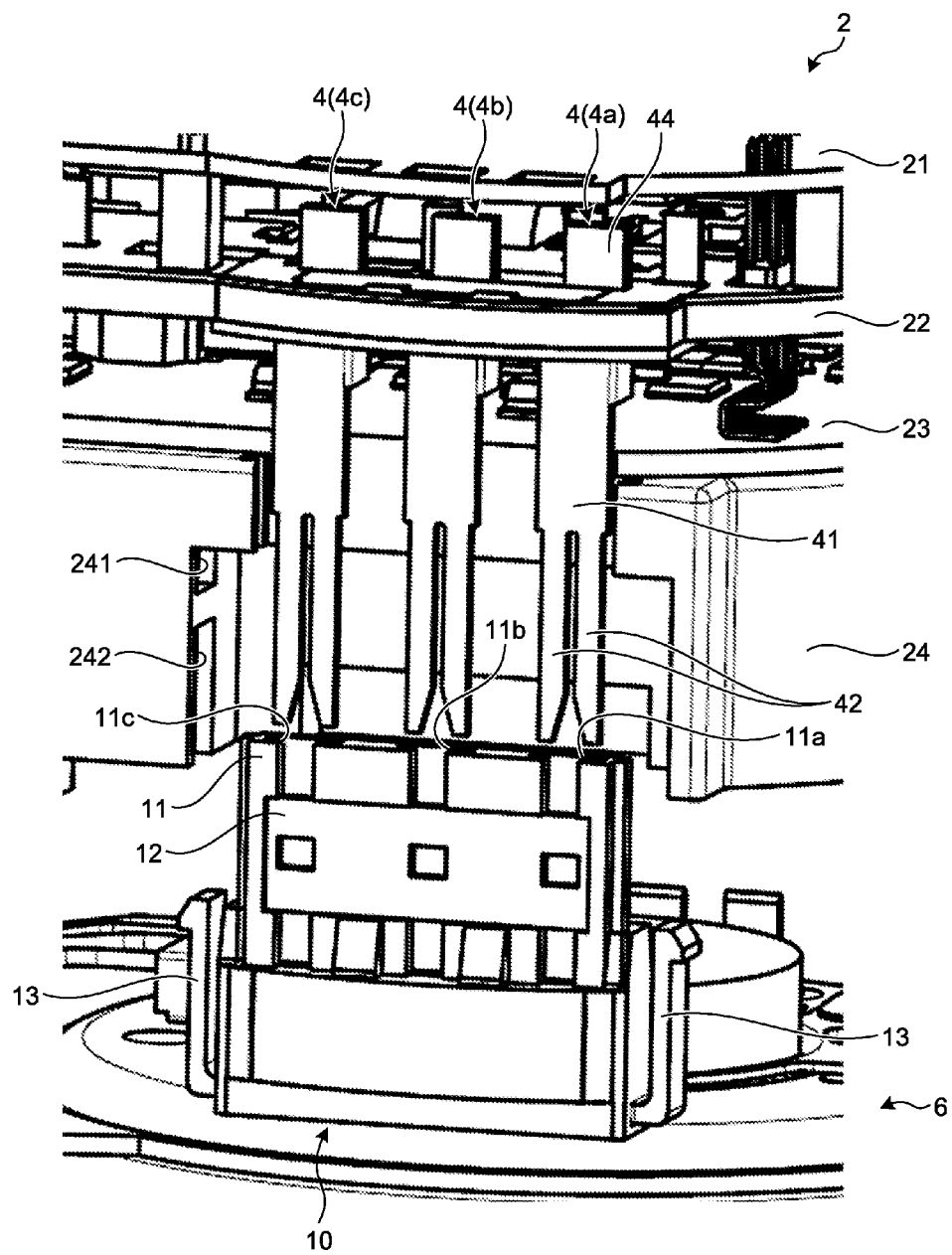
FIG. 6 is a perspective view illustrating an area around the terminal connection structure before connection of the first terminals and the second terminals.
Figure 7:
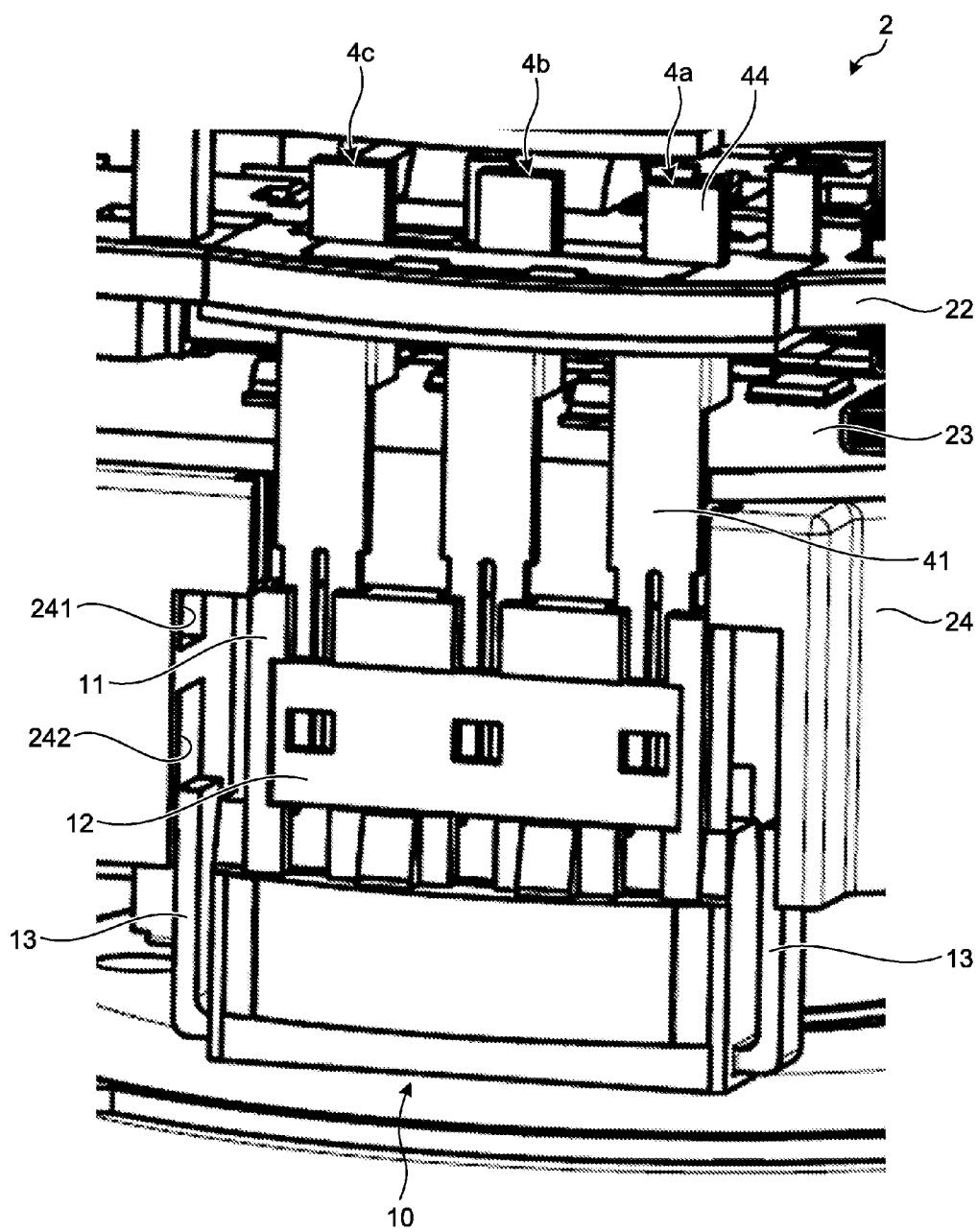
FIG. 7 is a perspective view illustrating an area around the terminal connection structure upon insertion of the second terminals into guide holes.

FIG. 6 is a perspective view illustrating an area around the terminal connection structure before connection of the first terminals and the second terminals. FIG. 7 is a perspective view illustrating the area around the terminal connection structure upon insertion of the second terminals into guide holes. FIGS. 8 to 11 are explanatory views illustrating behavior of a second terminal upon insertion of the second terminal into the guide hole. FIG. 12 is an enlarged perspective view illustrating the area around the terminal connection structure upon insertion of the second terminals into the guide holes. Note that, in FIGS. 8 to 11, the first terminal 3a and the second terminal 4a are typically illustrated, and the first terminal 3b, the first terminal 3c, the second terminal 4b, and the second terminal 4c are omitted.

As illustrated in FIG. 6, when the electric motor 6 and the ECU 2 are connected to each other, the three second terminals of the second terminal 4a, the second terminal 4b, and the second terminal 4c are disposed to face the guide hole 11a, the guide hole 11b, and the guide hole 11c, respectively. Then, the ECU 2 is slid to the electric motor 6. Thus, as illustrated in FIG. 7, the second terminal 4a, the second terminal 4b, and the second terminal 4c are inserted into the guide hole 11a, the guide hole 11b, and the guide hole 11c, respectively.

Figure 8:
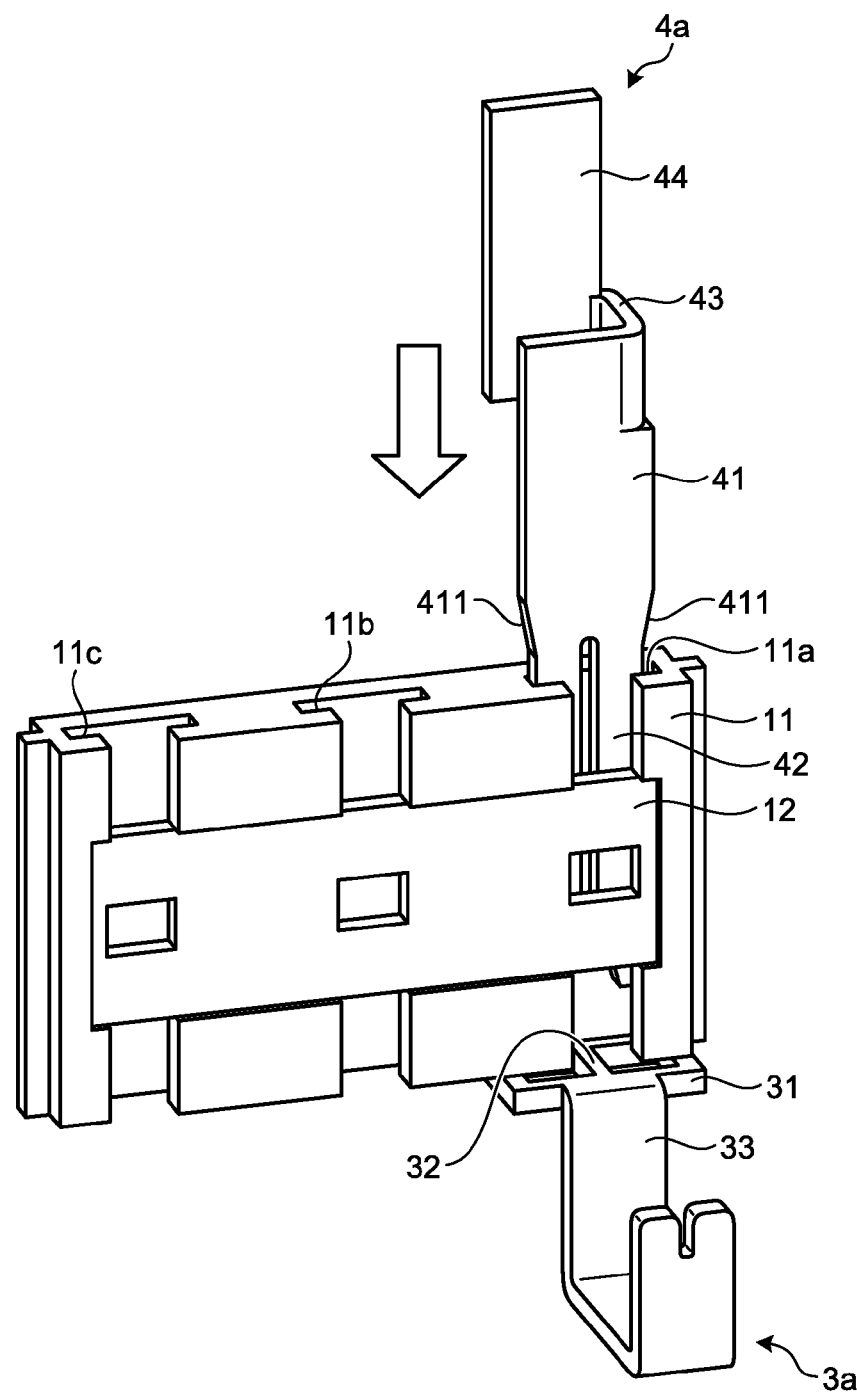
FIG. 8 is an explanatory view illustrating behavior of a second terminal upon insertion of the second terminal into a guide hole.

As described above, the length L3 of the holding portions 42 (see FIG. 4) is smaller than the length L1 of the guide hole 11a (see FIG. 3). Thus, even if a position of the second terminal 4a relative to the guide hole 11a is displaced in the width direction, the holding portions 42 can be moved through the guide hole 11a, as illustrated in FIG. 8.

Figure 9:
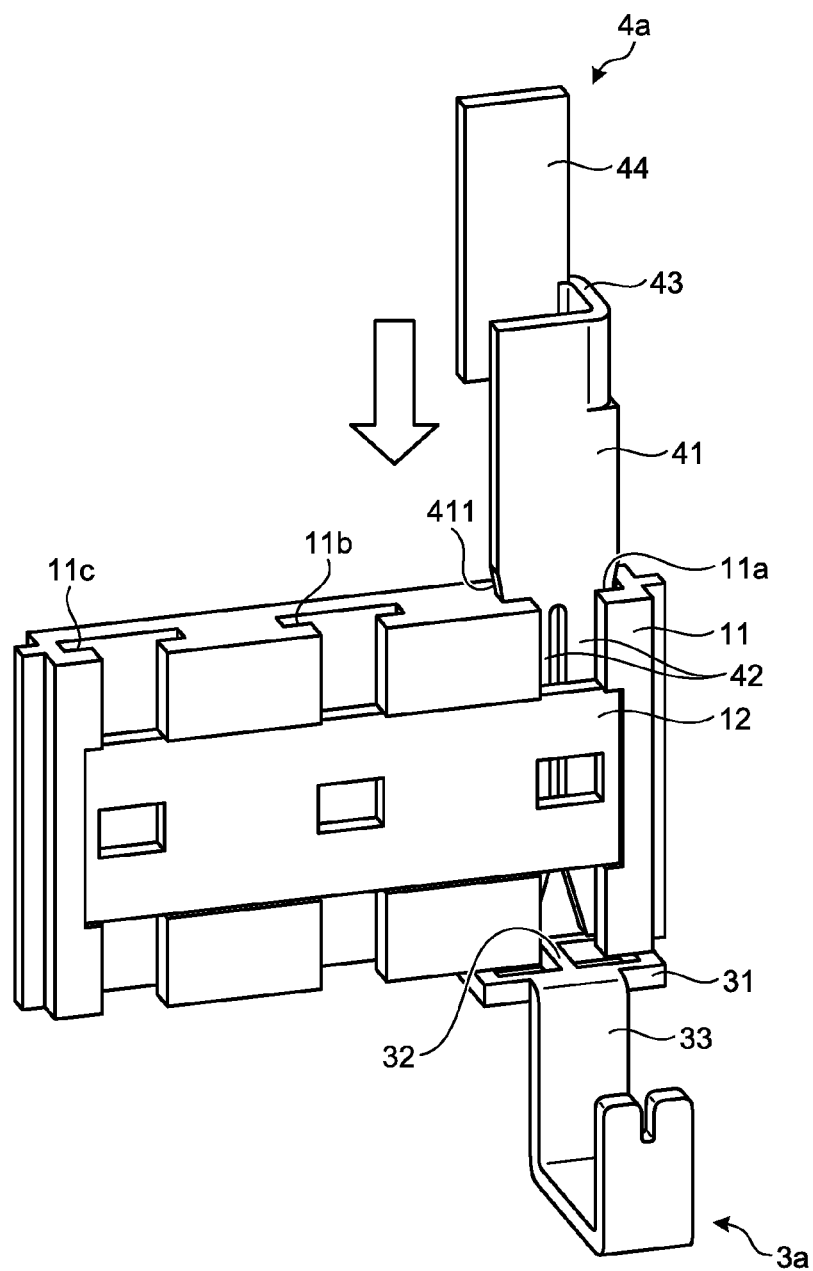
FIG. 9 is an explanatory view illustrating behavior of the second terminal upon insertion of the second terminal into the guide hole.

When the holding portions 42 are further moved through the guide hole 11a, the tapered portions 411 are inserted into the guide hole 11a. As described above, the length L2 of the base portion 41 (see FIG. 4) is substantially equal to the length L1 of the guide hole 11a (see FIG. 3). Thus, when a position of the second terminal 4a relative to the guide hole 11a is displaced in the width direction, the tapered portions 411 are brought into contact with an edge of the guide hole 11a, as illustrated in FIG. 9.

Figure 10:
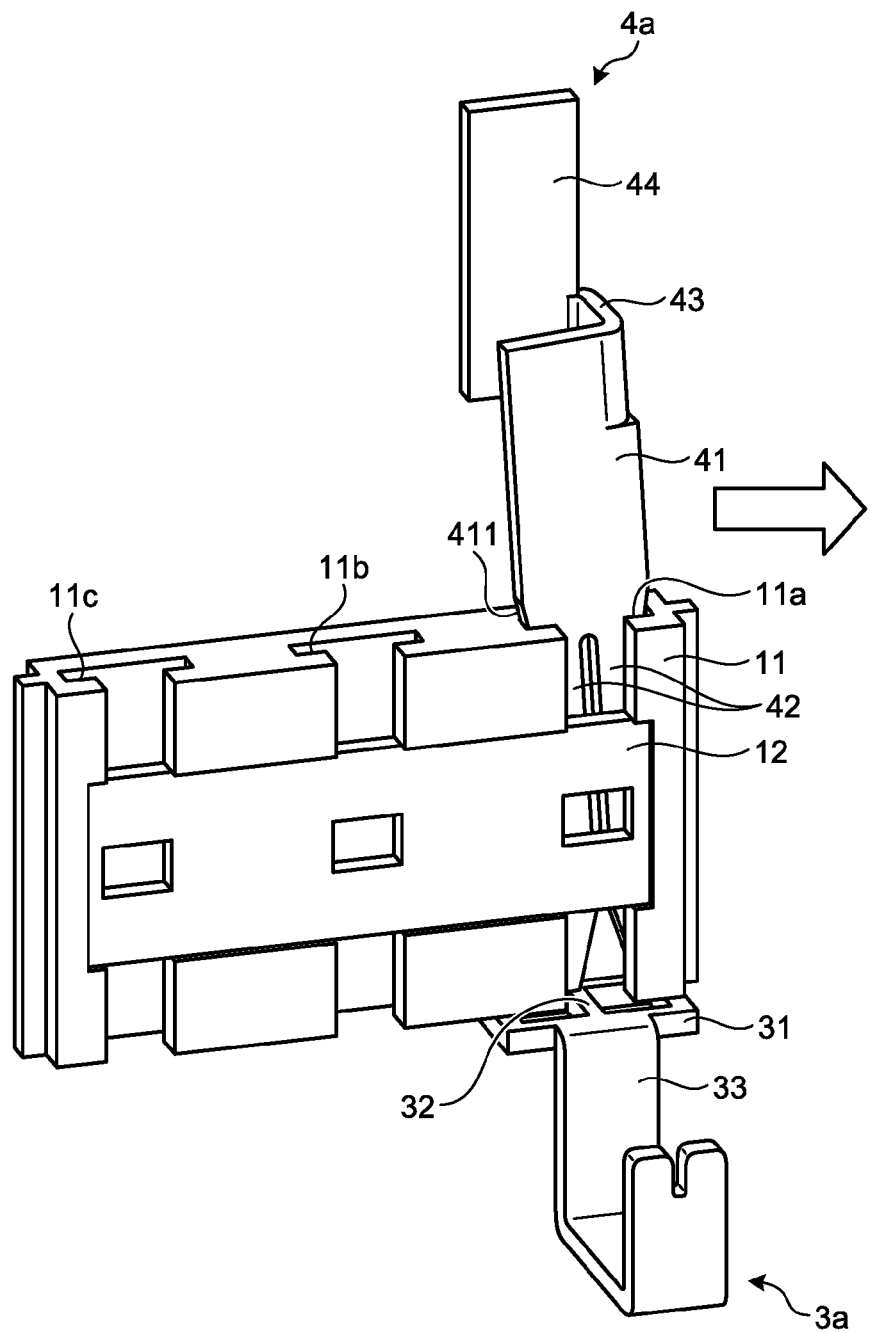
FIG. 10 is an explanatory view illustrating behavior of a second terminal upon insertion of the second terminal into the guide hole.

When the tapered portions 411 are further moved through the guide hole 11a, the second terminal 4a receives a reaction force in the width direction from the edge of the guide hole 11a. Thus, the base portion 41 and the holding portions 42 are inclined relative to the guide hole 11a, as illustrated in FIG. 10. In contrast, an inner wall of a hole of the second substrate 22 through which the connection portion 44 penetrates restricts inclination of the connection portion 44. Thus, the bridge portion 43 between the base portion 41 and the connection portion 44 is twisted. More specifically, an end portion of the bridge portion 43 near the base portion 41 is twisted counterclockwise when viewed from the front side. The bridge portion 43 has a plate-shaped member orthogonal to the base portion 41, and thus is readily deformed.

Figure 11:
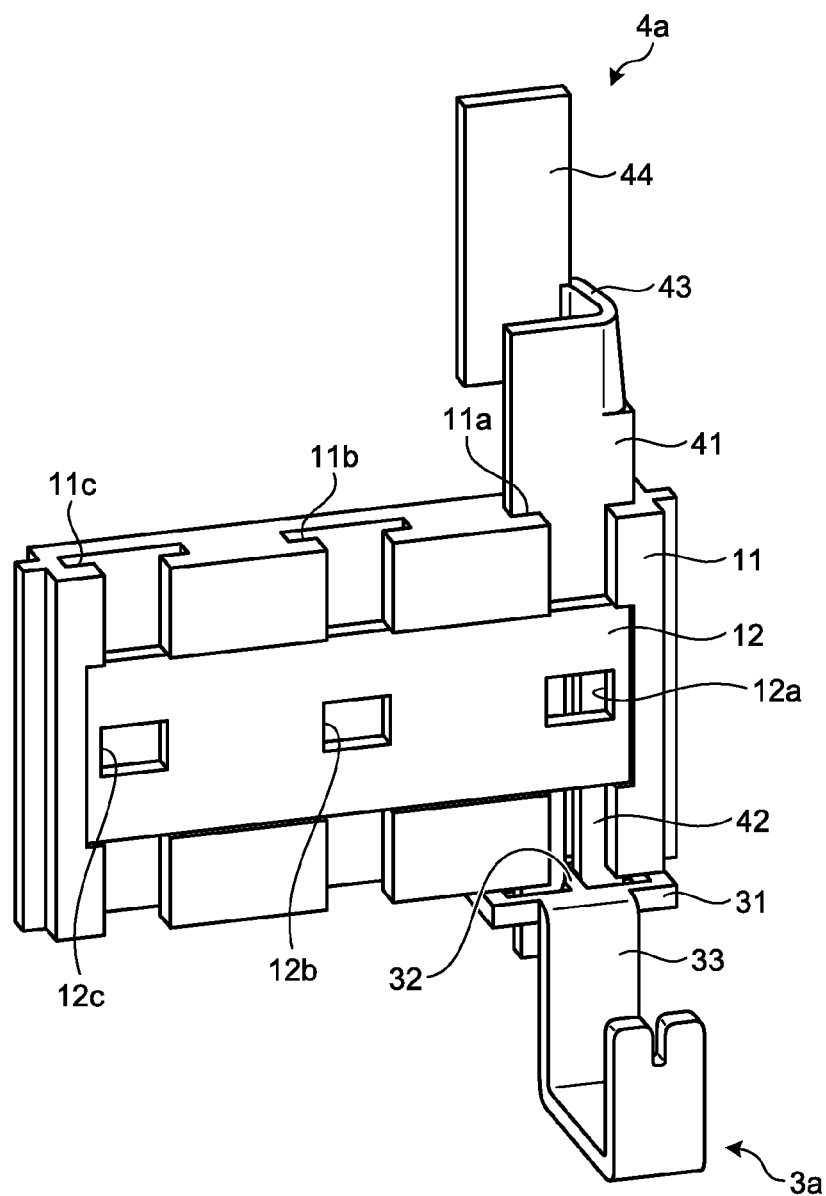
FIG. 11 is an explanatory view illustrating behavior of the second terminal upon insertion of the second terminal into the guide hole.
Figure 12:
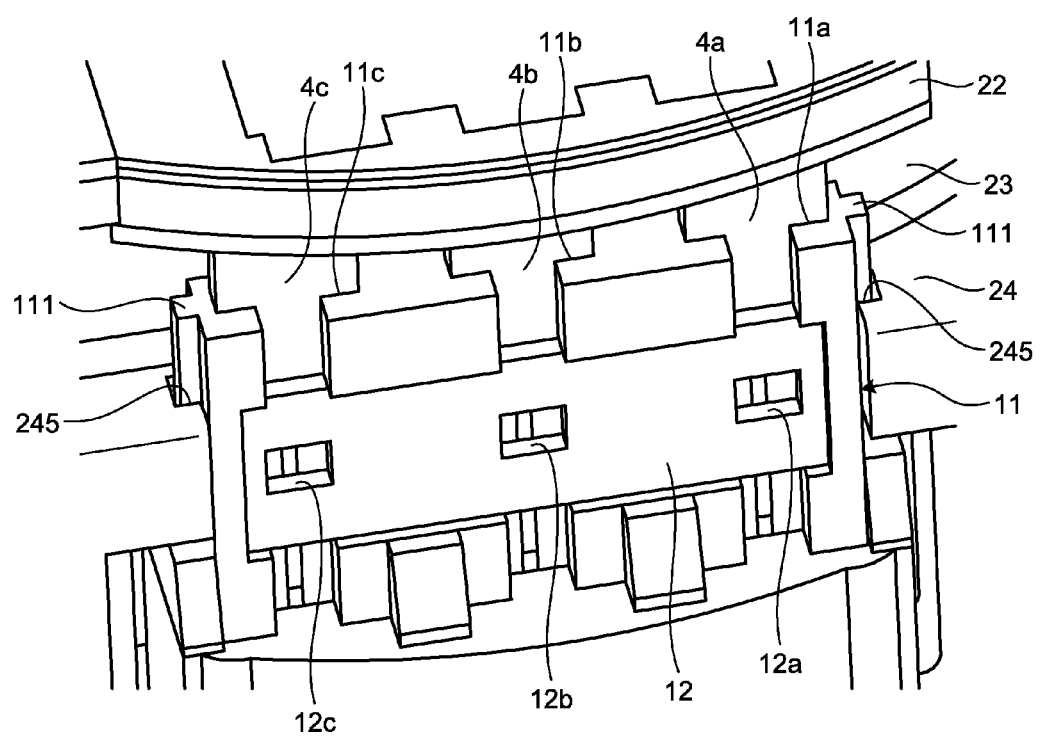
FIG. 12 is an enlarged perspective view illustrating an area around the terminal connection structure upon insertion of the second terminals into the guide holes.

When the second terminal 4a is further pressed to the first terminal 3a, the second terminal 4a is moved through the guide hole 11a while deforming the bridge portion 43, as illustrated in FIG. 11. Then, when the base portion 41 is moved through the guide hole 11a, the inclination of the second terminal 4a is corrected. That is, the holding portions 42 and the base portion 41 inserted into the guide hole 11a are maintained straight. Thereafter, a preliminary positioning mechanism 5 described later restricts movement of the holding portions 42 in the height direction. Finally, the ECU 2 is pressed (pressurized) downward to connect the first terminal 3a and the second terminal 4a. That is, the held portion 32 of the first terminal 3a and the holding portions 42 of the second terminal 4a form an electrical contact. Inclination of the second terminal 4a is corrected before the ECU 2 is pressed, so that the holding portions 42 can equally hold the held portion 32 from both sides. Furthermore, as described above, the upper end surface of the base portion 41 and the upper end surface of the bridge portion 43 are in contact with the lower surface of the second substrate 22, so that when the ECU 2 is pressed downward, a load is inhibited from being transmitted to a connected portion between the connection portion 44 and a terminal of the second substrate 22.

Furthermore, when the ECU 2 is pressed to the electric motor 6, a projection portion 111 of the terminal guide 11 is fitted into a recessed portion 245 of the heat sink 24, as illustrated in FIG. 12. The projection portion 111 is a projecting portion provided on a side surface of the terminal guide 11, along a height direction. The recessed portion 245 is a groove provided at a position of the heat sink 24 corresponding to the projection portion 111, along a height direction. Therefore, the projection portion 111 guides the heat sink 24 in the height direction. Thus, the second terminal 4a, the second terminal 4b, and the second terminal 4c can be readily moved straight through the guide hole 11a, the guide hole 11b, and the guide hole 11c, respectively.

Figure 13:
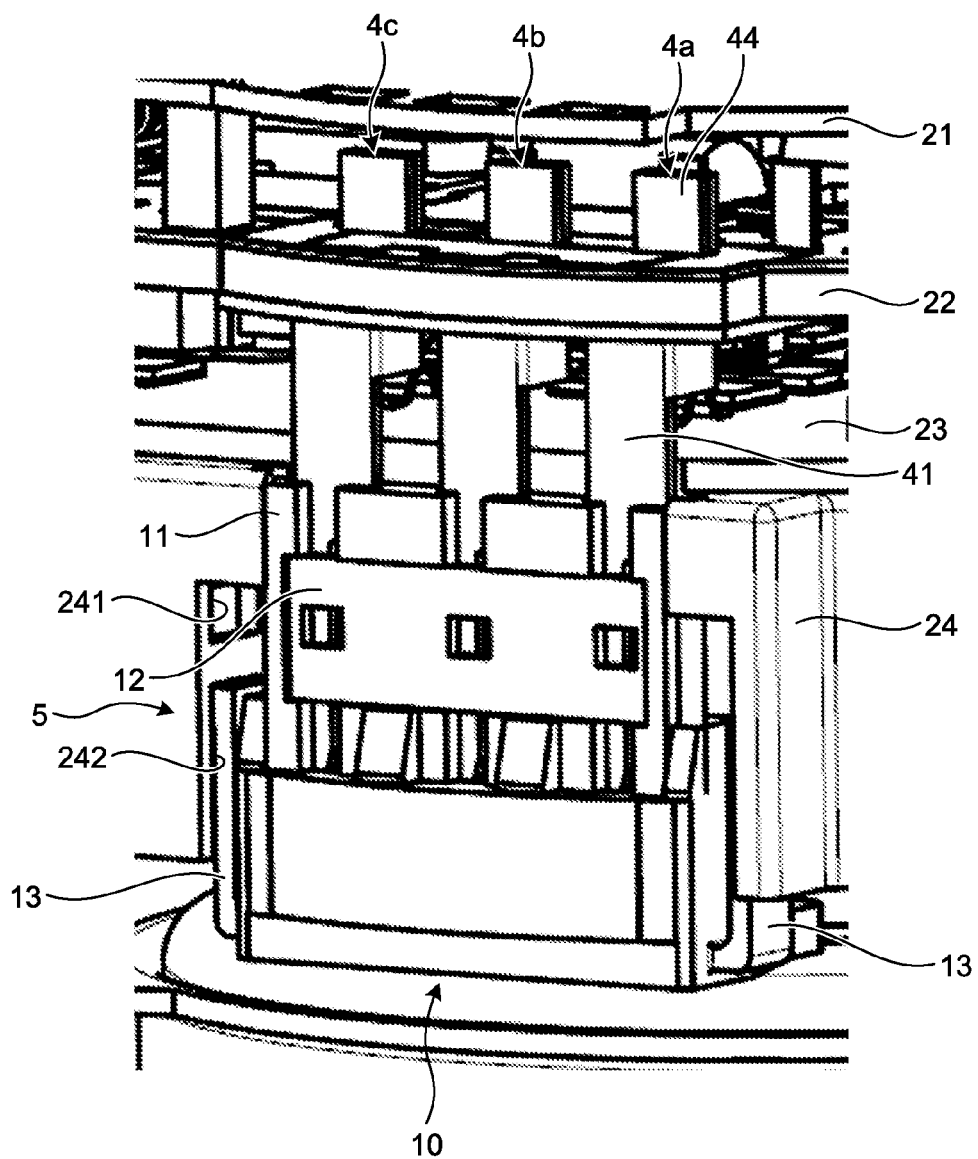
FIG. 13 is a perspective view illustrating an area around the terminal connection structure, where the second terminals reach one ends of the guide holes.
Figure 15:
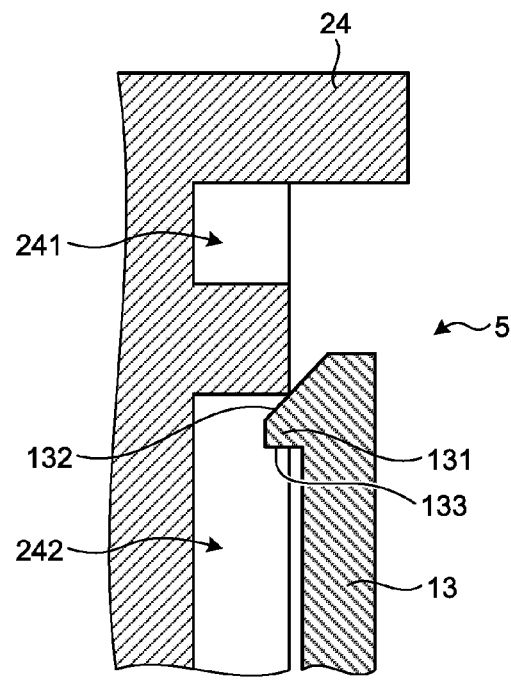
FIG. 15 is a cross-sectional view illustrating a preliminary positioning mechanism, where a second terminal reaches one end of a guide hole.
Figure 16:
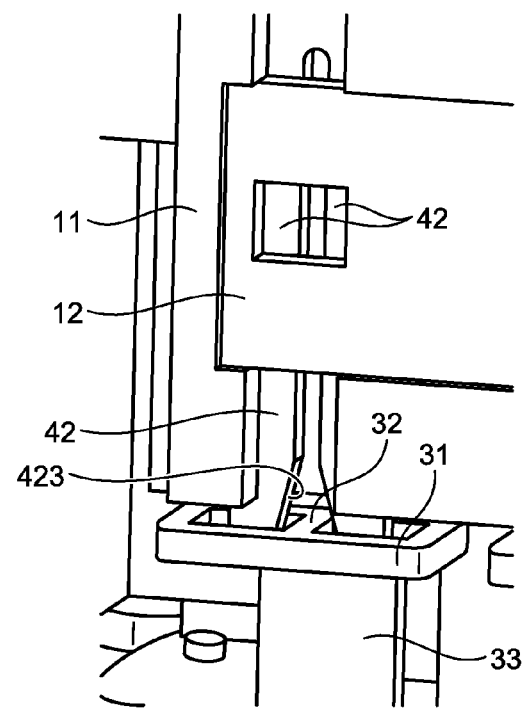
FIG. 16 is an enlarged view illustrating in an enlarged manner an area around a first terminal of FIG. 13.

FIG. 13 is a perspective view illustrating the area around the terminal connection structure, where the second terminals reach one ends of the guide holes. FIG. 14 is a view of the first terminals, where the motor side casing of FIG. 13 is omitted to expose the first terminals. FIG. 15 is a cross-sectional view illustrating the preliminary positioning mechanism, where a second terminal reaches one end of a guide hole. FIG. 16 is an enlarged view illustrating in an enlarged manner an area around a first terminal of FIG. 13. The preliminary positioning mechanism 5 is provided as illustrated in FIG. 13. The preliminary positioning mechanism 5 is for example the motor side casing 10 and the heat sink 24.

As illustrated in FIGS. 13 and 14, the motor side casing 10 includes two arms 13 facing the heat sink 24 in a width direction. The arms 13 are provided upward from both ends of the motor side casing 10 in a width direction. As illustrated in FIG. 15, each of the arms 13 has an end provided with a fitting projection 131 projecting in a width direction. The fitting projection 131 has an upper surface 132 as an upper side surface, and a portion of the upper surface 132 is inclined downward as it is close to the heat sink 24. The fitting projection 131 has a lower surface 133 as a lower side surface, and the lower surface 133 is a surface orthogonal to a height direction.

Furthermore, as illustrated in FIGS. 13 and 14, the heat sink 24 includes a fitting groove 241 and a fitting groove 242. The fitting groove 241 is a rectangular groove. The fitting groove 242 is a rectangular groove disposed below the fitting groove 241, and has an opening at a lower end portion.

When the ECU 2 is pressed toward the electric motor 6, the fitting projection 131 of the arm 13 is moved through the fitting groove 242, from the lower end portion of the fitting groove 242. Then, when respective ends of the holding portions 42 reach one ends (lower end portions) of the guide hole 11a, the guide hole 11b, and the guide hole 11c, the upper surface 132 of the fitting projection 131 is brought into contact with an edge of the fitting groove 242. Therefore, movement of the heat sink 24 is restricted, and thus the holding portions 42 are positioned in the height direction. In such a state, a holding portion 42 is not brought into contact with a held portion 32, as illustrated in FIG. 16. More specifically, each of the chamfered portions 423 faces the held portion 32, leaving gaps between the chamfered portions 423 and the held portion 32. As described above, immediately before connection of the first terminal 3 and the second terminal 4, the holding portions 42 are temporarily positioned in a height direction by the arm 13 and the fitting groove 242. Thus, determination of whether to adjust positions of the holding portions 42 relative to the held portion 32 is facilitated. When the position of the holding portions 42 relative to the held portion 32 is still displaced, the ECU 2 or the electric motor 6 is pressed (pressurized) in the width direction to forcibly deform the bridge portion 43. Therefore, accuracy in position of the holding portions 42 relative to the held portion 32 is increased.

Figure 17:
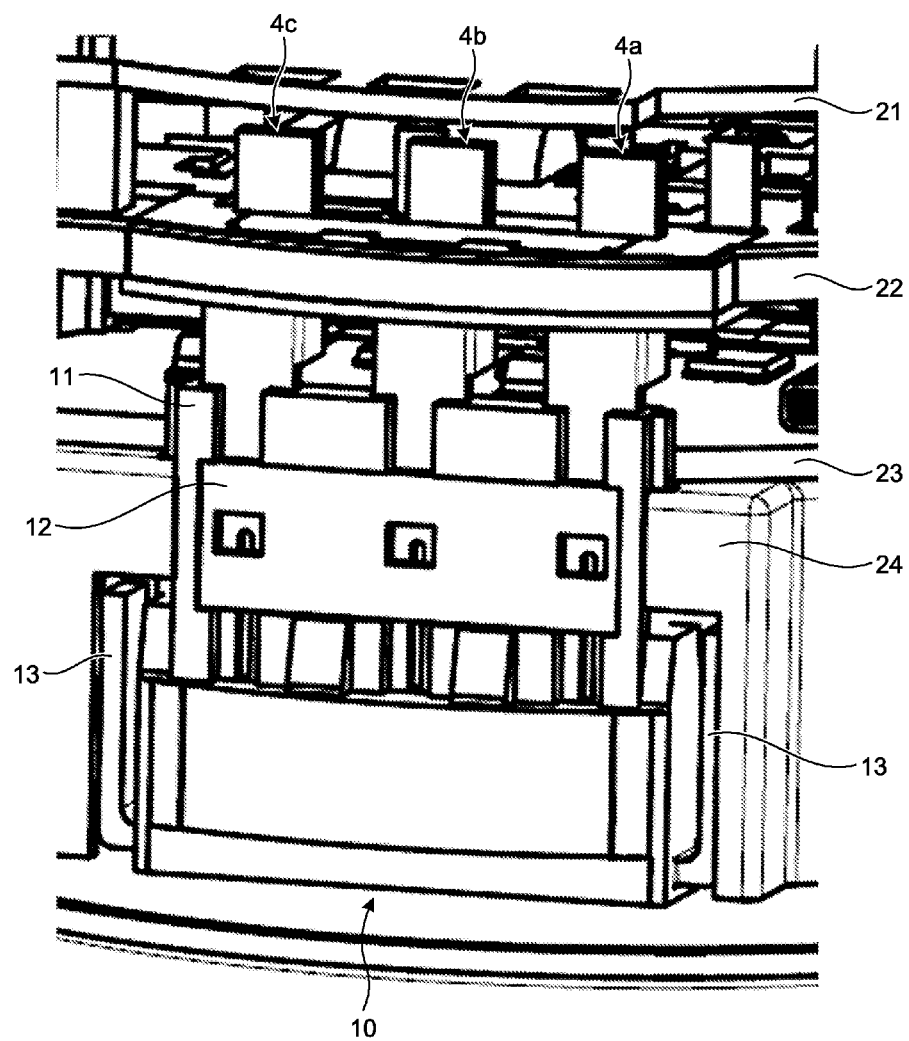
FIG. 17 is a perspective view illustrating an area around the terminal connection structure, when the first terminals and the second terminals are connected.
Figure 18:
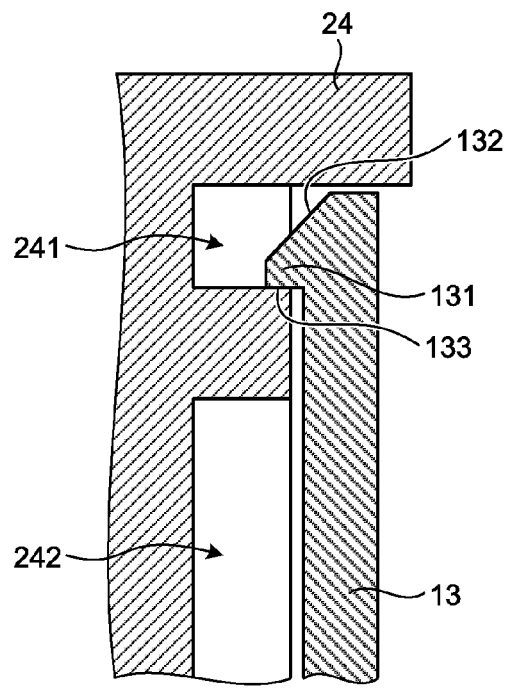
FIG. 18 is a cross-sectional view of the preliminary positioning mechanism, when a first terminal and a second terminal are connected.

FIG. 17 is a perspective view illustrating an area around the terminal connection structure, where the first terminals and the second terminals are connected. FIG. 18 is a cross-sectional view of the preliminary positioning mechanism, where a first terminal and a second terminal are connected.

After conditions illustrated in FIGS. 13 and 14, the ECU 2 is pressed (pressurized) downward. Therefore, as illustrated in FIG. 18, the fitting projection 131 of the arm 13 is elastically deformed, and moves over the edge of the fitting groove 242. Then, the fitting projection 131 is fitted into the fitting groove 241. That is, the ECU 2 is fixed to the electric motor 6 by snap-fit. The lower surface 133 of the fitting projection 131 is caught by an edge of the fitting groove 241, and downward movement of the arm 13 is restricted. That is, a positional relationship between the ECU 2 and the electric motor 6 is fixed. In such a condition, as illustrated in FIG. 3, the holding portions 42 are in contact with the held portion 32. Therefore, a conductive state is maintained between the first terminal 3 and the second terminal 4.

Figure 19:
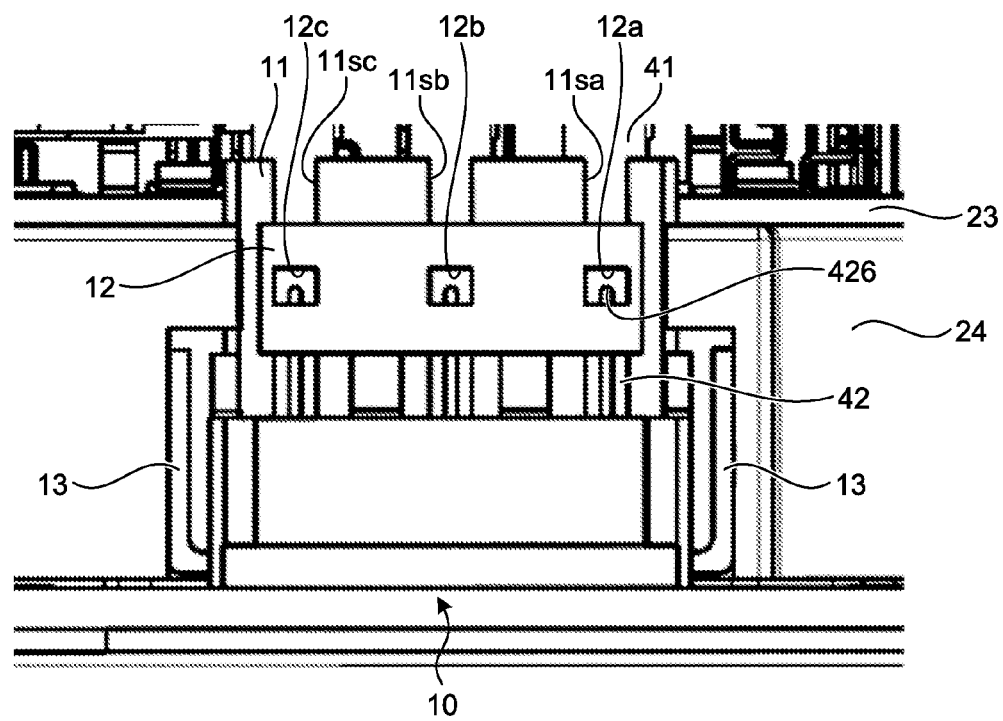
FIG. 19 is an enlarged side view illustrating an area around the terminal connection structure according to the present embodiment.
Figure 20:
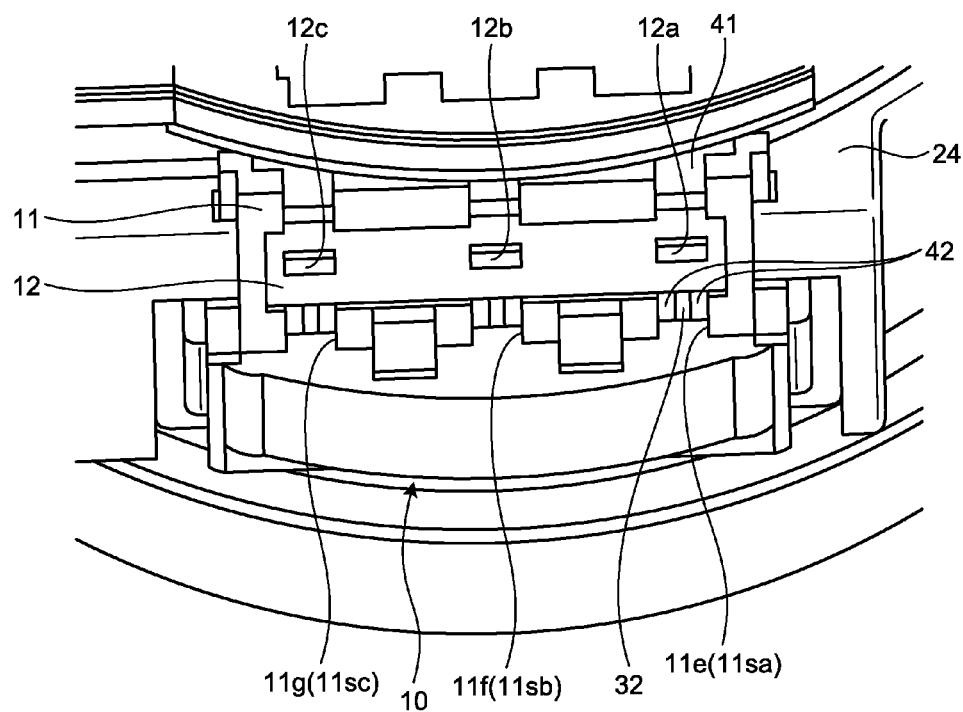
FIG. 20 is an enlarged perspective view illustrating an area around the terminal connection structure according to the present embodiment.

FIG. 19 is an enlarged side view illustrating an area around the terminal connection structure according to the present embodiment. FIG. 20 is an enlarged perspective view illustrating the area around the terminal connection structure according to the present embodiment. FIGS. 19 and 20 illustrate a contact state between the first terminals 3 and the second terminals 4, that is, a state illustrated in FIG. 17.

As illustrated in FIG. 19, base side end portions 426 of the respective holding portions 42 are exposed through the slits 11sa, 11sb, and 11sc, and the first windows 12a, 12b, and 12c. Therefore, the positions of the holding portions 42 in the height direction can be readily confirmed.

As illustrated in FIG. 20, connection parts between the holding portions 42 and the held portions 32 are exposed through a second window 11e, a second window 11f, and a second window 11g. The second windows 11e, 11f, and 11g are part of the slits 11sa, 11sb, and 11sc, respectively. Therefore, connections between the holding portions 42 and the held portions 32 can be readily confirmed.

Note that, in the second terminal 4, the bridge portion 43 does not necessarily have a plate shape orthogonal to the base portion 41, and preferably has a plate shape crossing the base portion 41. Furthermore, the shape formed by the base portion 41, the bridge portion 43, and the connection portion 44 when viewed in the height direction does not necessarily have a substantially U-shape. In order to restrict the buckling of the second terminal 4, the second terminal 4 preferably has a slenderness ratio smaller than that of a second terminal 4 without the bridge portion 43. Furthermore, each of the tapered portions 411 is not necessarily positioned between the base portion 41 and each holding portion 42. For example, the tapered portion 411 may be provided on a side surface of the base portion 41 (surface orthogonal to the width direction) (may be disposed above the position illustrated in FIG. 4). Alternatively, the tapered portion 411 may be provided on a side surface of the holding portion 42 (may be disposed below the position illustrated in FIG. 4).

Note that the cover 12 may be eliminated. In such a configuration, the slits 11sa, 11sb, and 11sc expose both the base side end portions 426 of the holding portions 42 and the connection parts between the holding portions 42 and the held portions 32. Furthermore, when the slits 11sa, 11sb, and 11sc are eliminated, the first windows 12a, 12b, and 12c are preferably provided as opening portions formed in a surface on the front side of the terminal guide 11.

As described above, in the electric power steering system 8 according to the present embodiment, the terminal connection structure 1 includes the first terminals 3, the second terminals 4, and the terminal guide 11. The first terminal 3 includes the held portion 32. Each of the second terminals 4 includes the plate-shaped base portion 41, a pair of holding portions 42 projecting from one end of the base portion 41 to hold the held portion 32 from both sides, and the plate-shaped bridge portion 43 projecting from the other end of the base portion 41 in a direction crossing relative to the base portion 41. The terminal guide 11 includes the guide hole 11a (the guide hole 11b or the guide hole 11c) having one end at which the first terminal 3 is disposed, and the other end from which the second terminal 4 is inserted.

When the second terminal 4 is inserted into the guide hole 11a (the guide hole 11b or the guide hole 11c), if a position of the second terminal 4 relative to the guide hole 11a is displaced in the width direction, a reaction force is applied to the second terminal 4 from the guide hole 11a. In such a condition, the bridge portion 43 has a plate-shaped member orthogonal to the base portion 41, and thus is readily deformed. Deformation of the bridge portion 43 corrects an attitude of the holding portion 42 along the guide hole 11a (the guide hole 11b or the guide hole 11c). Thus, an area of a contact portion of the second terminal 4 with the first terminal 3, and a pressure applied to the contact portion are each maintained to a predetermined magnitude. Thus, the terminal connection structure 1 according to the present embodiment can inhibit increase in contact resistance between the first terminal 3 and the second terminal 4.

Furthermore, in the terminal connection structure 1, the second terminal 4 includes the tapered portions 411 between the base portion 41 and the holding portions 42, the tapered portions 411 having a length reduced toward the ends of the holding portions 42, the length being in the width direction which is a direction parallel to the surface of the base portion 41 and orthogonal to the projecting direction of the holding portions 42. Therefore, a position receiving the reaction force from the guide hole 11a is located at a position far from the bridge portion 43 and not overlapping the holding portions 42. Thus, the reaction force from the guide hole 11a acts on the bridge portion 43, as a bending moment according to a distance from the bridge portion 43 to the tapered portion 411, and the reaction force is hardly consumed as a force deforming the holding portions 42. Accordingly, the reaction force from the guide hole 11a is efficiently transferred as a force deforming the bridge portion 43, and the bridge portion 43 can be deformed more easily.

Furthermore, the terminal connection structure 1 includes the preliminary positioning mechanism 5 positioning the ends of the holding portions 42 at one end of the guide hole 11a (the guide hole 11b or the guide hole 11c), before the second terminal 4 is connected to the first terminal 3. Therefore, the preliminary positioning mechanism 5 temporarily determines the position of the holding portions 42 in the height direction, immediately before connection of the first terminal 3 and the second terminal 4. Thus, determination of whether to adjust positions of the holding portions 42 relative to the held portion 32 is facilitated.

Furthermore, the terminal connection structure 1 includes the first window 12a (the first window 12b or the first window 12c) exposing a base side end portion 426 of the pair of holding portions 42. Therefore, the position of the holding portions 42 in the height direction can be readily confirmed.

Furthermore, the terminal connection structure 1 includes the second window 11e (the second window 11f or the second window 11g) exposing a connection between the holding portions 42 and the held portion 32. Therefore, connection between the holding portions 42 and the held portion 32 can be readily confirmed.

REFERENCE SIGNS LIST

1 TERMINAL CONNECTION STRUCTURE
10 MOTOR SIDE CASING
11 TERMINAL GUIDE
111 PROJECTION PORTION
11a, 11b, 11c GUIDE HOLE
11e, 11f, 11g SECOND WINDOW
11sa, 11sb, 11sc SLIT
12 COVER
12a, 12b, 12c FIRST WINDOW
13 ARM
131 FITTING PROJECTION
132 UPPER SURFACE
133 LOWER SURFACE
2 ELECTRONIC CONTROL UNIT (ECU)
21 FIRST SUBSTRATE
22 SECOND SUBSTRATE
23 THIRD SUBSTRATE
24 HEAT SINK
241, 242 FITTING GROOVE
245 RECESSED PORTION
3, 3a, 3b, 3c FIRST TERMINAL
31 BASE PORTION
32 HELD PORTION
33 CONNECTION PORTION
4, 4a, 4b, 4c SECOND TERMINAL
41 BASE PORTION
411 TAPERED PORTION
42 HOLDING PORTION
423 CHAMFERED PORTION
425 SLIT
426 BASE SIDE END PORTION
43 BRIDGE PORTION
44 CONNECTION PORTION
5 PRELIMINARY POSITIONING MECHANISM
6 ELECTRIC MOTOR
71 TORQUE SENSOR
72 REDUCTION GEAR
73 VEHICLE SPEED SENSOR
74 IGNITION SWITCH
8 ELECTRIC POWER STEERING SYSTEM
81 STEERING WHEEL
82 STEERING SHAFT
82a INPUT SHAFT
82b OUTPUT SHAFT
83 ACTUATOR
84 UNIVERSAL JOINT
85 LOWER SHAFT
86 UNIVERSAL JOINT
87 PINION SHAFT
88 STEERING GEAR
88a PINION
88b RACK
89 TIE ROD
9 VEHICLE

The invention claimed is:

1. A terminal connection structure comprising:
a first terminal including a held portion;
a second terminal including a plate-shaped base portion, a pair of holding portions projecting from one end of the base portion to hold the held portion from both sides, and a plate-shaped bridge portion projecting from the other end of the base portion in a direction crossing relative to the base portion; and
a terminal guide including a guide hole having one end at which the first terminal is disposed, and the other end from which the second terminal is inserted,
wherein the terminal guide includes a cover overlapping with the base portion and the holding portions in a direction orthogonal to the base portion, and the cover includes a window exposing a base side end portion of the pair of holding portions.

2. The terminal connection structure according to claim 1, wherein
the second terminal includes a tapered portion between the base portion and the holding portions, the tapered portion having a length reduced toward ends of the holding portions, the length being in a width direction which is a direction parallel to a surface of the base portion and orthogonal to a projecting direction of the holding portion.

3. The terminal connection structure according to claim 1, further comprising
a preliminary positioning mechanism positioning ends of the holding portions at one end of the guide hole, before the second terminal is connected to the first terminal.

4. A motor connected to
an electronic control unit through the terminal connection structure according to claim 1.

5. An actuator comprising:
the motor according to claim 4; and
a reduction gear.

6. An electric power steering system acquiring a steering assist torque from the actuator according to claim 5.

7. A vehicle on which
the electric power steering system according to claim 6 is mounted.

8. A terminal connection structure comprising:
a first terminal including a held portion;
a second terminal including a plate-shaped base portion, a pair of holding portions projecting from one end of the base portion to hold the held portion from both sides, and a plate-shaped bridge portion projecting from the other end of the base portion in a direction crossing relative to the base portion; and a terminal guide including a guide hole having one end at which the first terminal is disposed, and the other end from which the second terminal is inserted,
wherein the terminal guide overlaps with the holding portions in a direction orthogonal to the base station, and includes a window exposing a connection part between the holding portions and the held portion.

\* \* \* \* \*